(12) United States Patent
Ifergan

(10) Patent No.: US 7,637,609 B1
(45) Date of Patent: Dec. 29, 2009

(54) RESILIENT HINGE FOR EYEGLASSES

(75) Inventor: Nonu Ifergan, Town of Mount Royal (CA)

(73) Assignee: Chic Optic, Inc., Town of Mount Royal, Quebec ( * ) Notice: Subject to any disclaimer, the term of this patent is extended or adjusted under 35 U.S.C. 154(b) by 168 days.

(21) Appl. No.: 11/531,179

(22) Filed: Sep. 12, 2006

Related U.S. Application Data

(60) Provisional application No. 60/793,717, filed on Apr. 21, 2006, provisional application No. 60/776,234, filed on Feb. 24, 2006.

(51) Int. Cl.
*G02C 9/00* (2006.01)
(52) U.S. Cl. .......................... 351/153; 351/113; 16/228
(58) Field of Classification Search ................. 351/153, 351/111, 114, 123, 140, 41, 158, 113; 16/228; 403/76
See application file for complete search history.

(56) References Cited

U.S. PATENT DOCUMENTS

| | | | |
|---|---|---|---|
| 3,476,466 A | 11/1969 | Hopkins | |
| 3,531,190 A | 9/1970 | LeBlanc | |
| 4,017,165 A | 4/1977 | Davis | |
| 4,345,848 A | 8/1982 | Cheselka | |
| 4,494,834 A | 1/1985 | Tabacchi | |
| 4,689,851 A | 9/1987 | Beyer | |
| 4,747,183 A | 5/1988 | Drlik | |
| 4,953,966 A | 9/1990 | Segoshi et al. | |
| 5,229,795 A | 7/1993 | Heintzelman | |
| 5,321,442 A | 6/1994 | Albanese | |
| 5,517,258 A | 5/1996 | Naito | |
| 5,568,207 A | 10/1996 | Chao | |
| 5,589,895 A * | 12/1996 | Mizuno | 351/153 |
| 5,596,789 A | 1/1997 | Simioni | |
| 5,640,217 A | 6/1997 | Hautcoeur et al. | |
| 5,652,635 A | 7/1997 | Kirschner | |
| 5,745,952 A | 5/1998 | Baragar | |
| 5,877,838 A | 3/1999 | Chao | |
| 5,882,101 A | 3/1999 | Chao | |
| 5,883,688 A | 3/1999 | Chao | |
| 5,883,689 A | 3/1999 | Chao | |
| 5,889,575 A | 3/1999 | Wang | |
| 5,929,964 A | 7/1999 | Chao | |

(Continued)

FOREIGN PATENT DOCUMENTS

CA 2190875 5/1997

(Continued)

OTHER PUBLICATIONS

U.S. Appl. No. 11/531,180, filed Sep. 12, 2006, Ifergan.

(Continued)

*Primary Examiner*—Hung X Dang
(74) *Attorney, Agent, or Firm*—Greenberg Traurig, LLP

(57) ABSTRACT

The present invention relates to a hinge assembly for use with eyeglasses. In one embodiment, the present invention provides a hinge assembly to attach a temple to a main frame of a pair of eyeglasses. The hinge assembly of this embodiment may include a pair of hinge members (formed as a ball and socket) rotationally attached to one another and each resiliently attached (e.g., using a spring) to a respective one of the temple and the main frame of the pair of eyeglasses.

22 Claims, 13 Drawing Sheets

U.S. PATENT DOCUMENTS

| | | | |
|---|---|---|---|
| 6,050,686 A * | 4/2000 | De Rossi | 351/153 |
| 6,116,730 A | 9/2000 | Kwok | |
| 6,168,341 B1 | 1/2001 | Chene | |
| 6,438,798 B1 | 8/2002 | Chene | |
| 6,464,354 B1 | 10/2002 | Chen et al. | |
| 6,513,926 B1 | 2/2003 | Kizu | |
| 6,530,660 B1 | 3/2003 | Chao | |
| 6,618,901 B1 | 9/2003 | Wang-Lee | |
| 6,652,093 B1 | 11/2003 | Lamy | |
| 6,721,991 B2 | 4/2004 | Dioguardi | |
| 7,073,904 B2 | 7/2006 | Chene | |
| 7,380,935 B2 | 6/2008 | Ifergan | |
| 2002/0085171 A1 | 7/2002 | Wang-Lee | |
| 2003/0020867 A1 | 1/2003 | Dei Negri et al. | |
| 2005/0078272 A1 | 4/2005 | Quehin | |
| 2005/0163560 A1 | 7/2005 | Chene | |
| 2006/0050226 A1 | 3/2006 | Chene et al. | |

FOREIGN PATENT DOCUMENTS

| | | |
|---|---|---|
| CA | 2181020 | 1/1998 |
| CA | 2235088 | 10/1998 |
| CA | 2235823 | 10/1998 |
| CA | 2235897 | 11/1998 |
| CA | 2236025 | 4/1999 |
| CA | 2258142 | 2/2000 |
| CA | 2347052 | 4/2000 |
| FR | 2816072 | 1/2003 |
| JP | 61041117 | 2/1986 |
| WO | WO-97/35085 A1 | 9/1997 |
| WO | WO03087917 | 10/2003 |
| WO | WO-2004/097500 A2 | 11/2004 |
| WO | WO2004/113996 | 12/2004 |
| WO | WO2005121870 | 12/2005 |

OTHER PUBLICATIONS

Non-final Office Action from U.S. Appl. No. 11/531,180 (US Patent 7,380,935) dated Oct. 5, 2007.

Notice of Allowance and Fees from U.S. Appl. No. 11/531,180 (US Patent 7,380,935) dated Mar. 25, 2008.

* cited by examiner

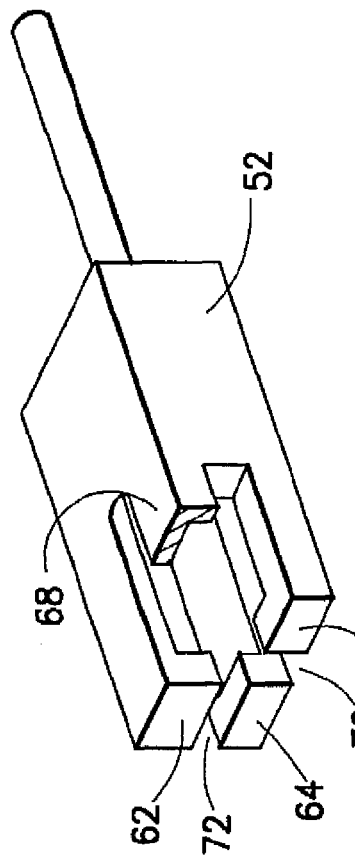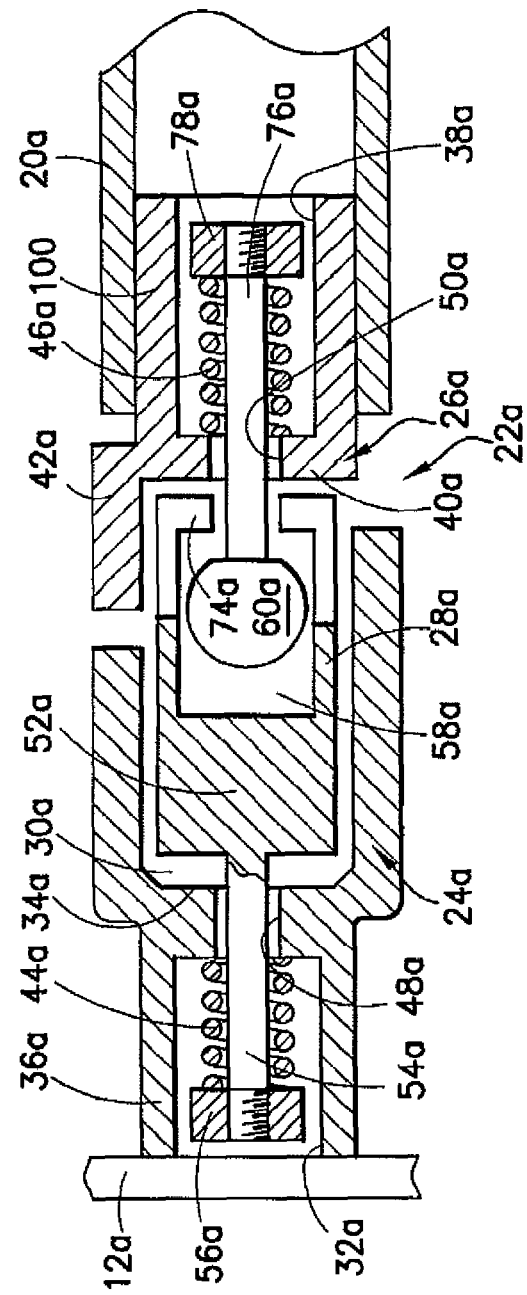

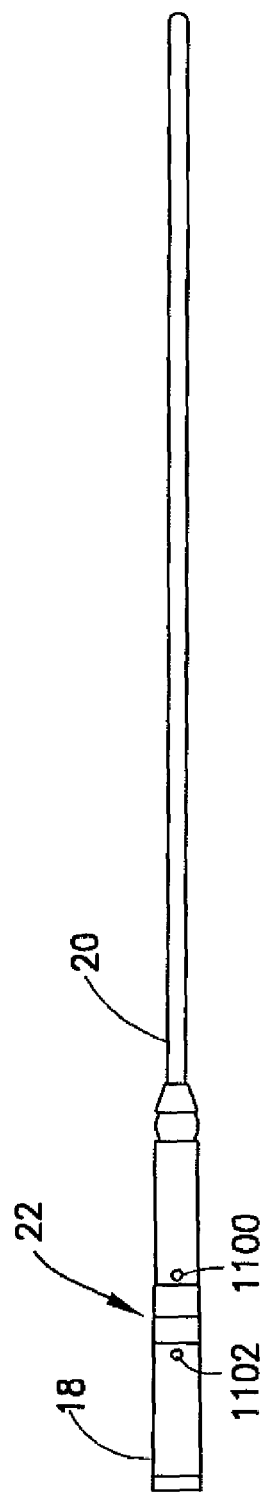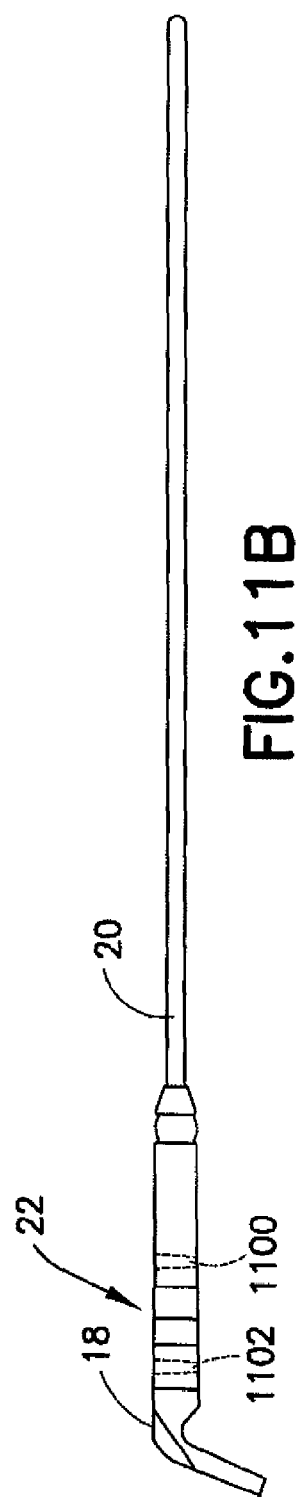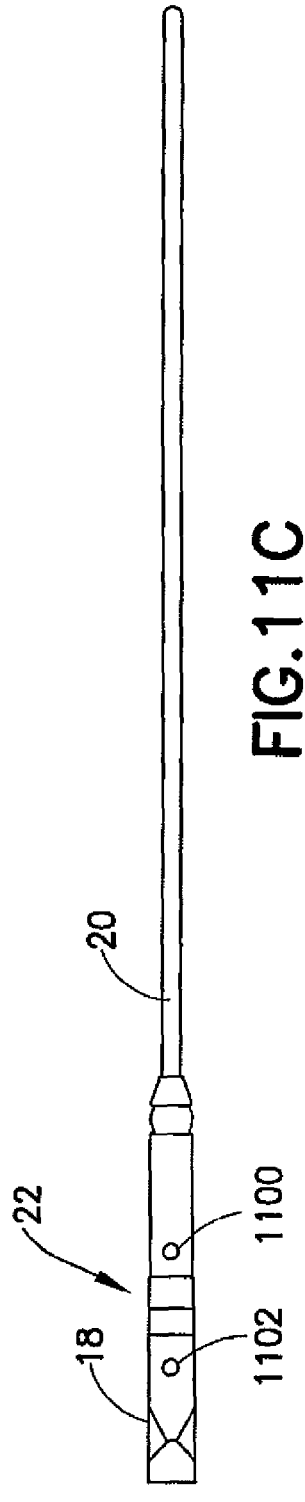

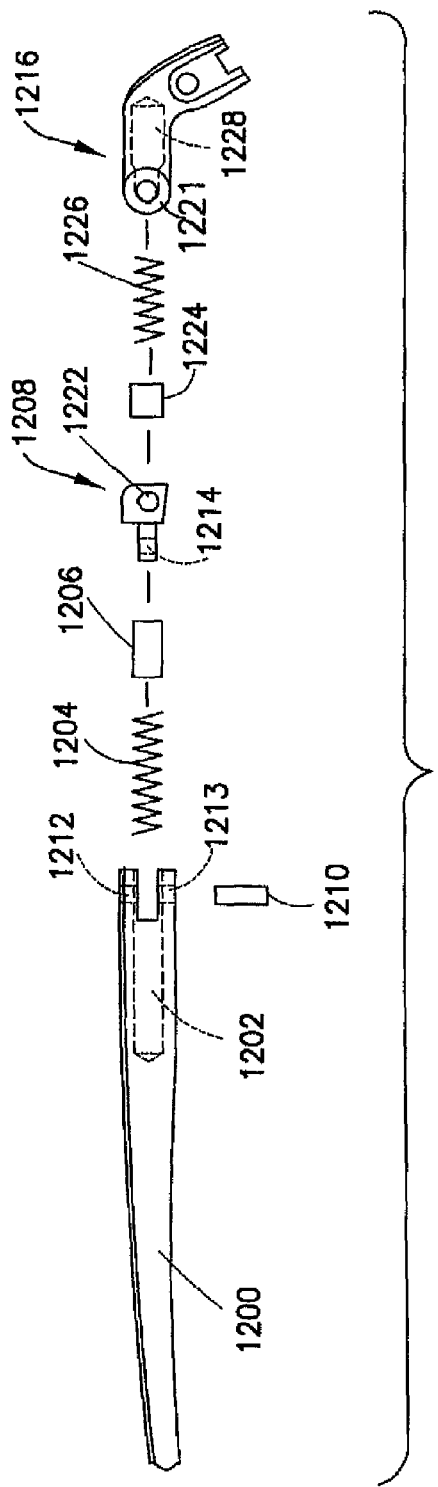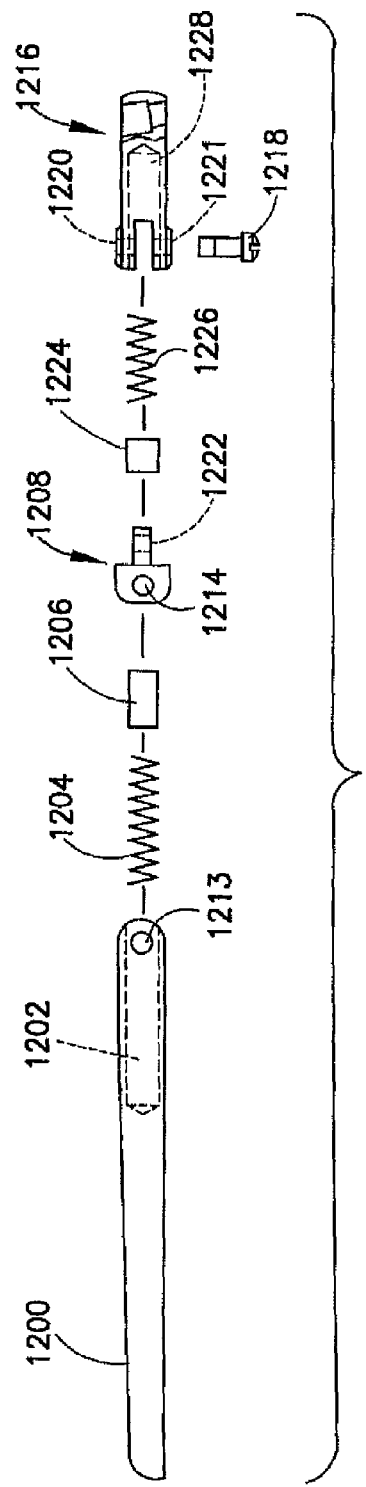

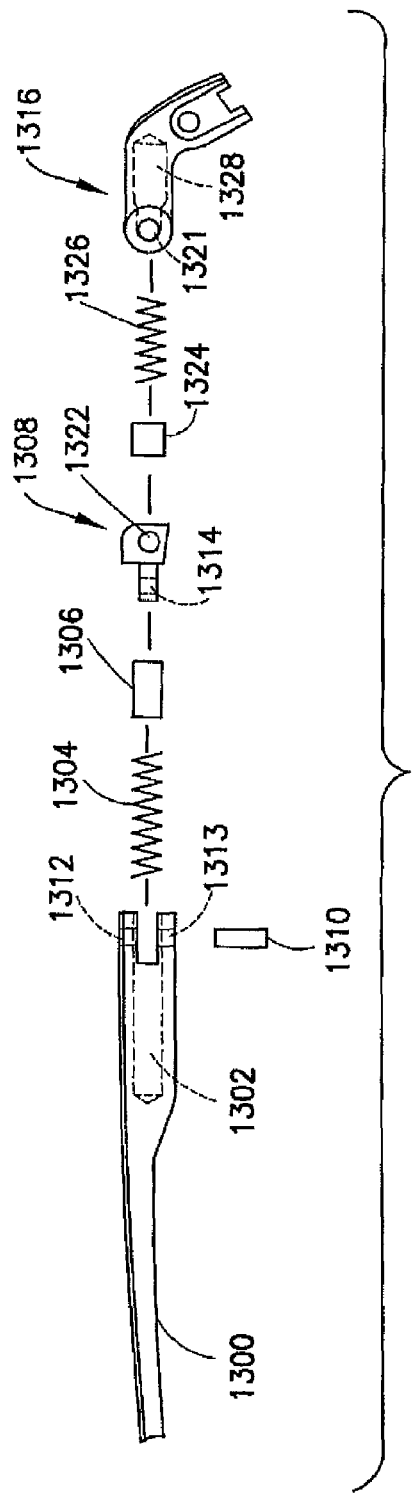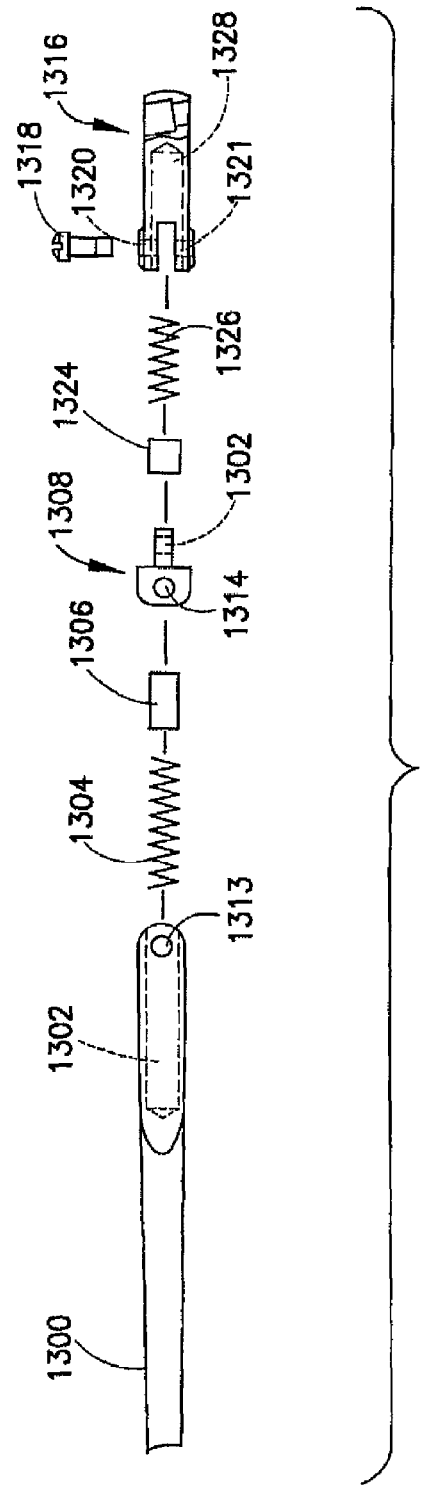
FIG. 13A
FIG. 13B

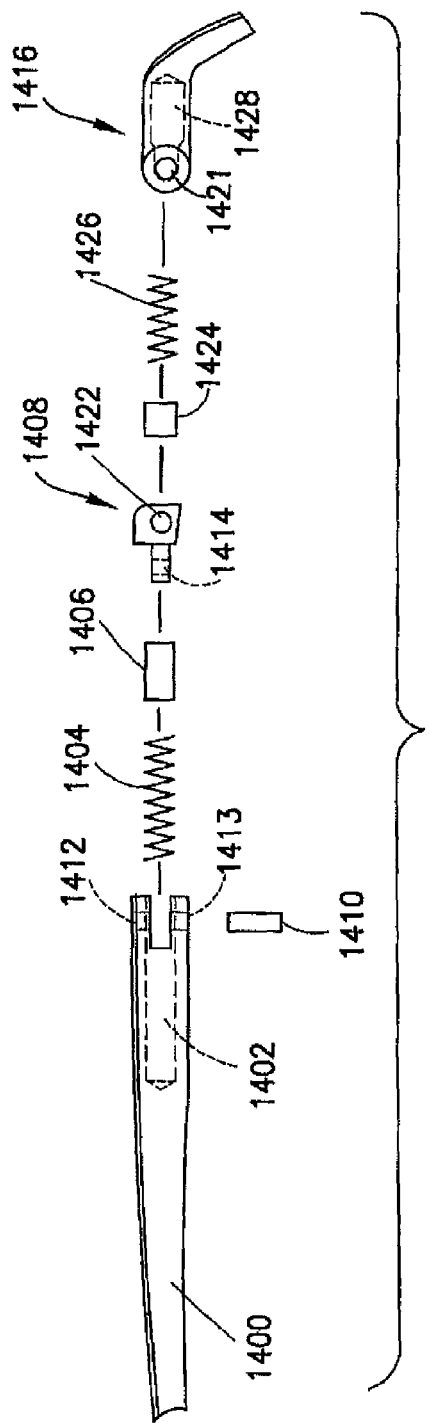
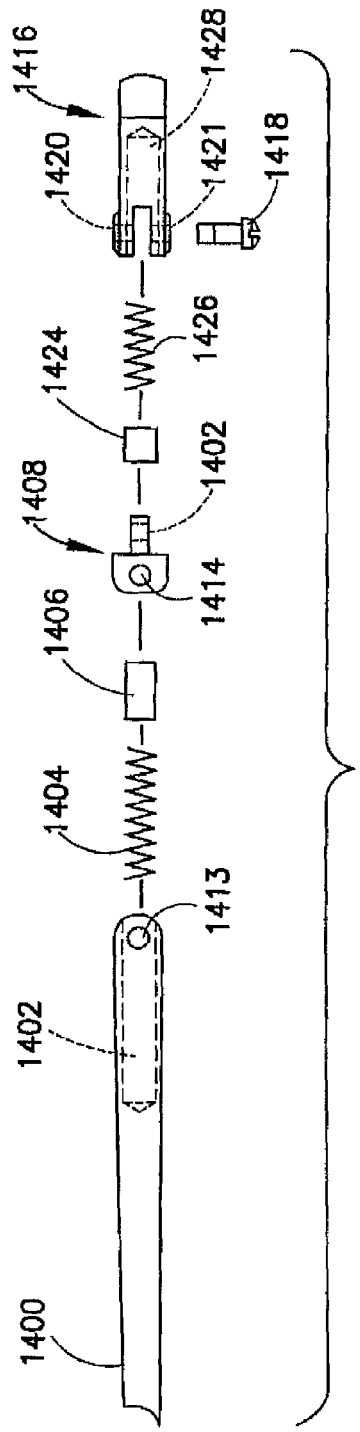

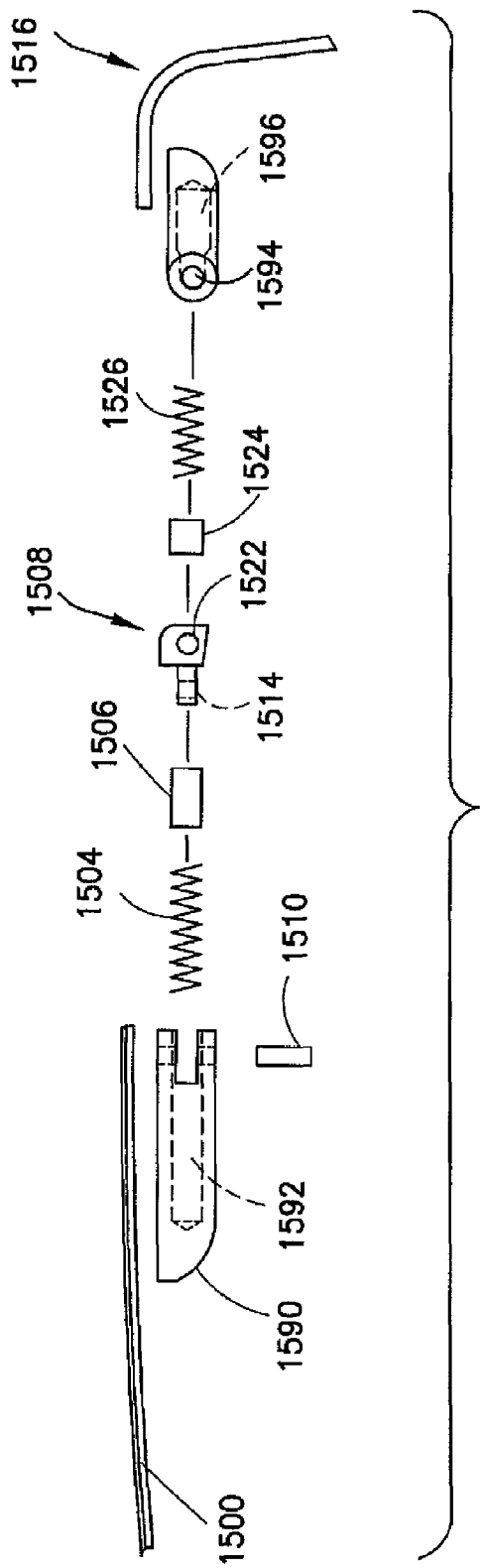
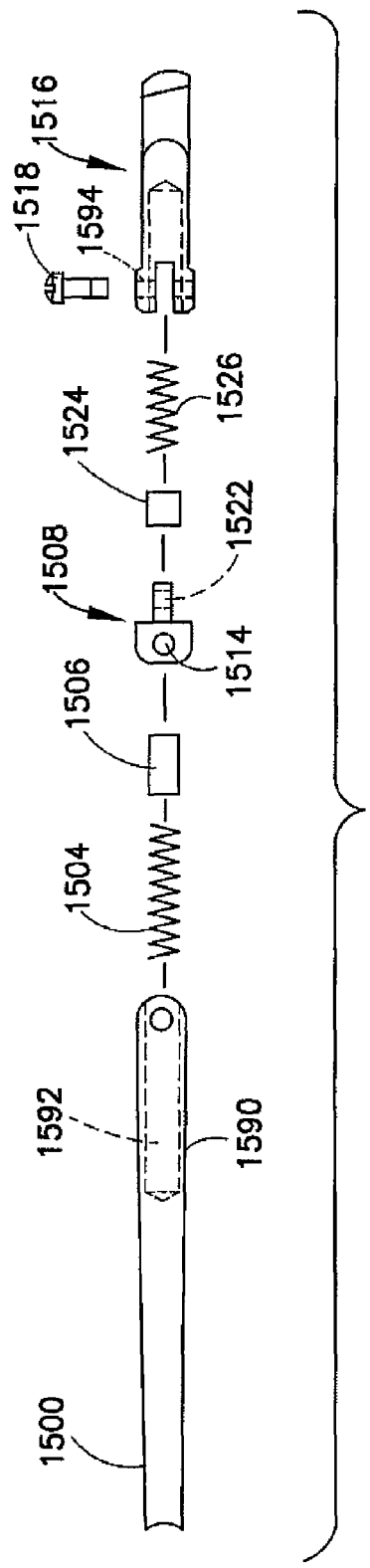
FIG. 15A
FIG. 15B

RESILIENT HINGE FOR EYEGLASSES

RELATED APPLICATIONS

This application claims the benefit of U.S. Provisional Application Ser. No. 60/793,717, filed Apr. 21, 2006 and U.S. Provisional Application Ser. No. 60/776,234, filed Feb. 24, 2006. Each of the aforementioned applications is incorporated herein by reference in its entirety.

FIELD OF THE INVENTION

The present invention relates to a hinge assembly for use with eyeglasses.

In one embodiment, the present invention provides a hinge assembly to attach a temple to a main frame of a pair of eyeglasses. The hinge assembly of this embodiment may include a pair of hinge members (formed as a ball and socket) rotationally attached to one another and each resiliently attached (e.g., using a spring) to a respective one of the temple and the main frame of the pair of eyeglasses.

For the purposes of describing and claiming the present invention the term "resiliently attached" is intended to refer to the flexible attachment of one element to another (as compared to an essentially immovable attachment of one element to another). To give one example (which example is intended to be illustrative and not restrictive), one element may be resiliently attached to another element via use of a spring.

BACKGROUND OF THE INVENTION

Eyeglasses (e.g., spectacle frames, sunglasses and other types of eyewear) are available in a diverse array of types, shapes, sizes, and materials. Generally, spectacle frames come into three basic types—full, semi or half-rimless, and rimless. A "full" eyeglass frame is comprised of a lens rim that completely encircles the lens. In a "semi-rimless" eyeglass frame there is no rim encircling the bottom or top of the lens. On the other hand, "rimless" eyeglass frames normally have no rim around the lens. For the most part, rimless eyeglasses come in three pieces (two end pieces and the nose bridge), although other variations also exist. In this rimless configuration, the lens or lenses form part of the spectacle frame. Generally, in a rimless configuration, each lens is routinely drilled so that the components fit snugly into the lens. While the invention is described using one specific example of spectacle frames, the invention can, of course, be adapted and used for rimmed, semi-rimless and/or rimless frames. For the purpose of ease and convenience, embodiments illustrated show a "full" eyeglass frame but each figure could be illustrated with any of the varying types of construction detailed above or others known in the art.

Regardless of the type of frame, eyeglasses typically include a pair of temples (that is, right and left temples) that extend rearwardly from the main frame for engagement with the user's ears. Each temple is typically attached to the main frame at a temple region of the main frame by a hinge to allow the temple to be folded behind the main frame for storage when not in use (as discussed above, the main frame may or may not be formed by including one or more lenses and each temple region may or may not be formed at or included on one or more of the lenses—for example, in the full configuration the main frame is distinct from each lens and each temple region is formed at the distinct main frame; in contrast, in the rimless configuration the main frame is formed at least partially from one or more lenses and each temple region is formed at or included on one or more of the lenses).

In some conventional eyeglasses, the hinge permits folding and unfolding of the temple but inhibits movement of the temple in the unfolded state beyond a position in which the temple is generally perpendicular to the main frame. In that unfolded position the hinge is relatively vulnerable to abnormal loads that may occur in use. Such loads may occur, for example, from accidental contact with the eyeglasses or from improper storage. In this regard, the hinge is typically one of the more vulnerable components of the eyeglasses and, accordingly, damage to the hinge frequently occurs.

BRIEF DESCRIPTION OF THE DRAWINGS

FIG. 5 is a partially cut-away perspective view of a component used in the hinge assembly of FIGS. 2-4;

FIG. 6 is a sectional view similar to FIG. 3 of another embodiment of the present invention;

FIGS. 11A-11C are, respectively, inside, top and outside views of a portion of a pair of eyeglasses according to an embodiment of the present invention;

FIGS. 12A and 12B are exploded views showing the components of a hinge assembly according to another embodiment of the present invention;

FIGS. 13A and 13B are exploded views showing the components of a hinge assembly according to another embodiment of the present invention;

FIGS. 14A and 14B are exploded views showing the components of a hinge assembly according to another embodiment of the present invention;

FIGS. 15A and 15B are exploded views showing the components of a hinge assembly according to another embodiment of the present invention;

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Figure 1:
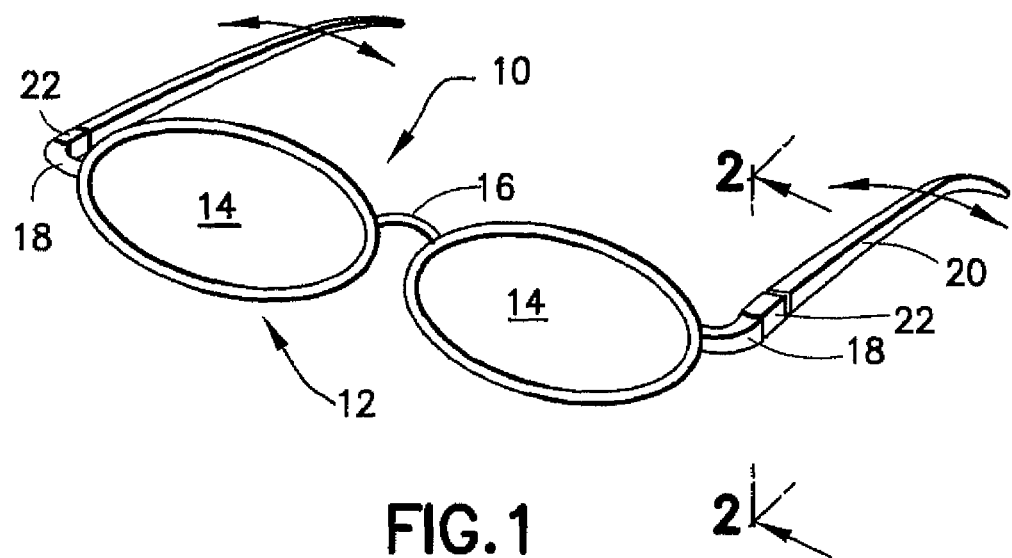
FIG. 1 is a perspective view of a pair of eyeglasses according to an embodiment of the present invention.

Referring now to the embodiment of FIG. 1, a pair of eyeglasses generally indicated at 10 includes a main frame 12 having openings 14 to receive lenses. The main frame 12 includes a bridge 16 and a pair of temple regions 18 (that is, right and left temple regions). Of note, each temple region 18 may be formed as an integral part of the main frame 12 or may be attached (e.g., via glue, solder, crimping, screws, bolts or any other desired mechanism) to the main frame 12. A pair of temples 20 (that is, right and left temples) extend rearwardly from the temple regions 18 and are attached to the main frame 12 at the temple regions 18 by a hinge assembly 22, which is shown in greater detail in FIGS. 2 through 5 (in this embodiment, the two hinge assemblies are essentially identical, although other embodiments may utilize distinct hinge assemblies such as configured for right side or left side use).

Figure 2:
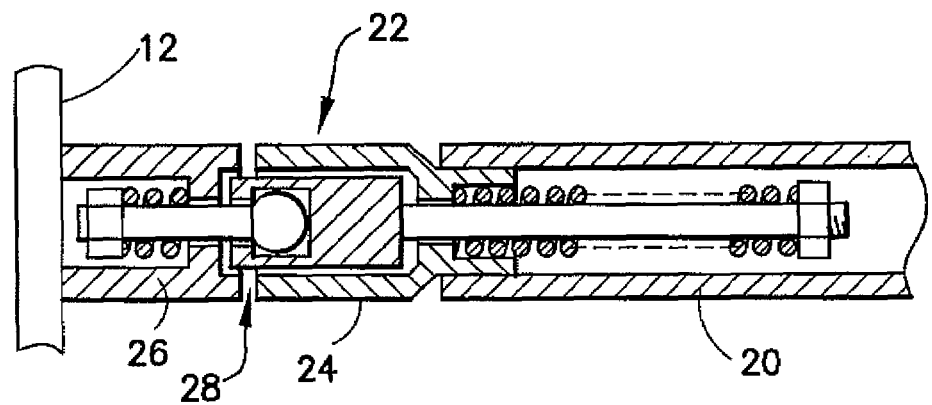
FIG. 2 is a section on the line II-II of FIG. 1.

Referring now to FIG. 2, each hinge assembly 22 bridges between a respective temple 20 and the temple region 18 of the main frame 12. The hinge assembly 22 has a pair of housings 24, 26. Housing 24 is attached to a respective temple 20 (while housing 24 is shown here as disposed within temple 20, housing 24 could, in other examples, be disposed adjacent temple 20 or surrounding temple 20). Housing 26 is attached to the main frame 12 in the respective temple region 18 (while housing 26 is shown here as disposed adjacent temple region 18, housing 26 could, in other examples, be disposed within temple region 18 or surrounding temple region 18). The housings 24, 26 accommodate a ball and socket joint generally indicated at 28, the details of which will be described below.

Figure 3:
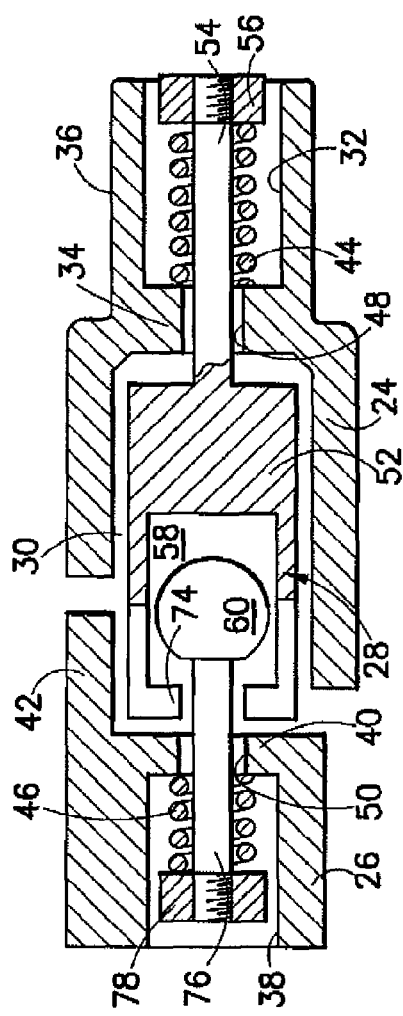
FIG. 3 is a view of a portion of the hinge assembly shown in FIG. 2.
Figure 4:
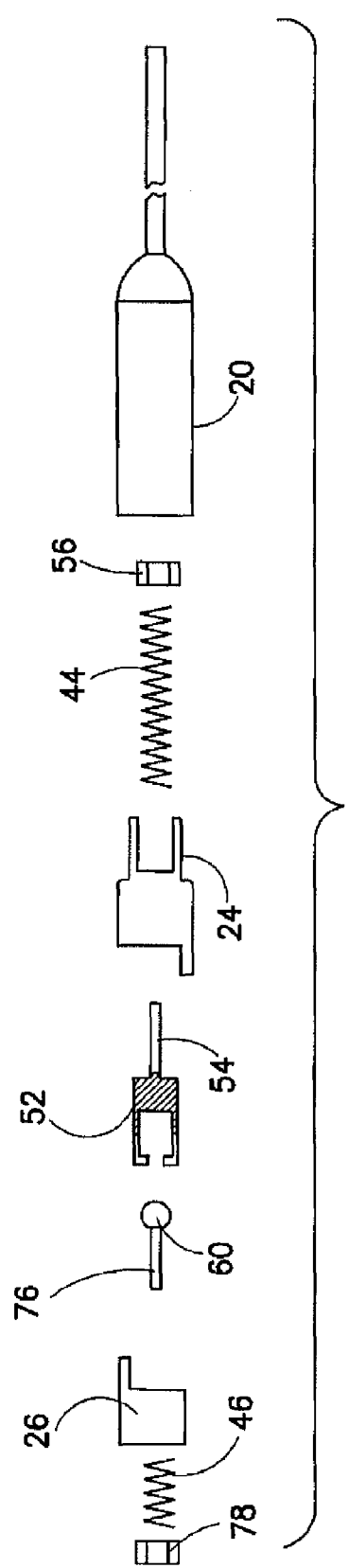
FIG. 4 is an exploded view showing the components of the hinge assembly shown in FIG. 2.

Referring now to FIG. 3, it is seen that the housing 24 has a forwardly directed cavity 30 and a rearwardly directed cavity 32 between which a partition 34 is formed (each of cavity 30, 32 may have a cylindrical cross section, a square cross-section, a rectangular cross section, a triangular cross section, or any other desired shape). The rear of the housing 24 includes extension 36 to attach to an end of the temple 20 (the interface between the extension and the temple may have a cylindrical cross section, a square cross-section, a rectangular cross section, a triangular cross section, or any other desired shape). The housing 26 has a forwardly directed cavity 38 with a partition 40 delineating the cavity 38 (cavity 38 may have a cylindrical cross section, a square cross-section, a rectangular cross section, a triangular cross section, or any other desired shape). An overhang 42 is provided on the side of the partition 40 opposite to the cavity 38 and adjacent to the housing 24.

Each of the cavities 32, 38, receives a compression spring 44, 46 that is seated against a respective partition 34, 40. Each of the partitions 34, 40 has an opening 48, 50 (each of opening 48, 50 may be cylindrical, square, rectangular, triangular, or any other desired shape).

The ball and socket joint 28 includes a socket member 52 located within the housing 24. The socket member 52 has a projection 54 that extends through the opening 48 and through the center of the spring 44 (projection 54 may have a cross section that is cylindrical, square, rectangular, triangular, or any other desired shape—depending upon the shape of opening 48). The distal portion of the projection 54 is threaded and receives a securing nut 56 that bears against the spring 44 (in another example, rather than using a securing nut threaded to the distal portion of projection 54, an end piece may be crimped, snapped-on or otherwise attached to the distal portion of projection 54 to retain spring 44).

The end of the socket member 52 opposite to the projection 54 is formed as a cavity 58 to receive a ball member 60 (the cavity 58 may have a cylindrical cross section, a square cross-section, a rectangular cross section, a triangular cross section, or any other desired shape). The cavity 58 is defined by four fingers 62, 64, 66, 68 (finger 68 is shown partially cut-away in the view of FIG. 5) respectively defined by a pair of longitudinal slots 70, 72 in the wall of the socket member 52 (although this embodiment utilizes four fingers and a pair of slots, any desired number of fingers and slots may be utilized). Each of the fingers 62, 64, 66, 68 terminates at its forward end in an inwardly directed flange 74 that overlies the open end of the cavity 58. The ball 60 has a pin 76 extending forwardly and through the opening 50 in the partition 40 (pin 76 may have a cylindrical cross section, a square cross-section, a rectangular cross section, a triangular cross section, or any other desired shape—depending upon the shape of opening 50). The pin 76 passes through the spring 46 and is secured by securing nut 78 threaded onto the distal end of the pin 76 (in another example, rather than using a securing nut threaded to the distal end of pin 76, an end piece may be crimped, snapped-on or otherwise attached to the distal end of pin 76 to retain spring 46).

One example of the steps which may be carried out to assemble the hinge assembly 22 will now be described. In this example, the socket member 52 is inserted within the cavity 30 in housing 24. It will be noted from FIG. 5 that the exterior of the socket member 52 may be non-circular (e.g., rectangular). In this case, the socket member 52 will have a fixed orientation within the cavity 30 (when the cavity 30 has a non-circular shape matching that of socket member 52). The spring 44 is then inserted into the cavity 32 over projection 54 and secured with the securing nut 56.

The ball 60 is then inserted into the cavity 58 by forcing the ball 60 axially between the fingers 62, 64, 66, 68 (the ends of one or more of fingers 62, 64, 66, 68 may be angled or chamfered to aid in insertion of ball 60 into cavity 58). The fingers have sufficient flexibility to separate and allow the ball 60 to snap into the cavity 58. The inturned flanges 74 provide an abutment surface against which the ball 60 seats and is retained (in operation, pin 76 may extend through the slots 70 and 72 to allow the ball to pivot with respect to the socket member 52). The housing 26 may then be inserted over the pin 76 and the spring 46 located within the cavity 38 (surrounding the pin 76). The spring is then retained by the securing nut 78.

When assembled, the end face of the socket member 52 bears against the outer face of the partition 40 under the action of the spring 46 (when spring 46 pulls on ball 60 and, indirectly, socket member 52). In order to fold the temple 20 behind the main frame 12, rotation occurs between the ball 60 and the socket member 52. As rotation occurs, the edge of the socket member 52 forms a line of rotation so that the springs 46 and 44 are compressed as the housing 24 is rotated relative to the housing 26. As the housing 24 rotates, the pin 76 passes along the slot 72 to allow the temple 20 to fold behind the main frame 12.

Unfolding the temple 20 from behind the main frame 12 similarly produces a relative pivotal movement between the housing 24 and housing 26 (with the springs 44, 46 providing a bias that acts to hold the temple 20 in the unfolded position). If a force is applied to move the temple 20 further outwardly relative to the main frame 12 (that is, beyond a position in which the temple 20 is generally perpendicular to the main frame 12), a movement similar to that occurring when the temple 20 is folded will occur with the springs 44, 46 yielding to accommodate the further outward movement. The temple 20 is thus not subjected to excessive bending forces and upon removal of the further outwardly directed force, the springs 44, 46 will cause the temple to return to its normal unfolded position (that is, generally perpendicular to the main frame 12).

Further, under normal conditions, the overhang 42 cooperates with the upper side of the socket member 52 to inhibit rotation of the temple 20 about a horizontal axis of the ball joint (that is, the overhang 42 cooperates with the upper side of the socket member 52 to inhibit rotation of the temple 20 up and down relative to the main frame 12). If, however, an abnormal load is applied in a vertical plane, the springs 44, 46 will again yield to permit relative pivoting between the housings 24 and 26 (that is, allow movement of the temple 20 up and down relative to the main frame 12). In this case, the pin 76 passes along the slot 70 to accommodate the displacement (the springs 44, 46 provide a return bias once the up/down loading is removed).

In another embodiment shown in FIG. 6, housing 24a is attached to the main frame 12, and housing 26a is attached to the end of the temple 20a. In FIG. 6, like elements from FIGS. 1-5 are given like reference numerals with the suffix "a" for clarity. It will be appreciated that the hinge assembly 22a operates in a manner similar to hinge assembly 22 described above and the details thereof need not be reiterated. It will be noted from FIG. 6 that the pin 76a and projection 54a are suitably sized in order to accommodate variations in the size of cavities 32a and 38a that may be required in order to reverse the orientation of housings 24a and 26a when compared to the orientation of housings 24 and 26 as shown in FIG. 3. The springs 44a and 46a are also suitably chosen to accommodate variations in the size of cavities 32a and 38a as required. It will also be noted from FIG. 6 that overhang 42a is modified to include a stepped portion 100 that is oriented to attach to the end of the temple 20a such that housing 26a will fit with temple 20a in a manner similar to the fit of the housing 24 and temple 20 as shown in FIG. 3.

Figure 7:
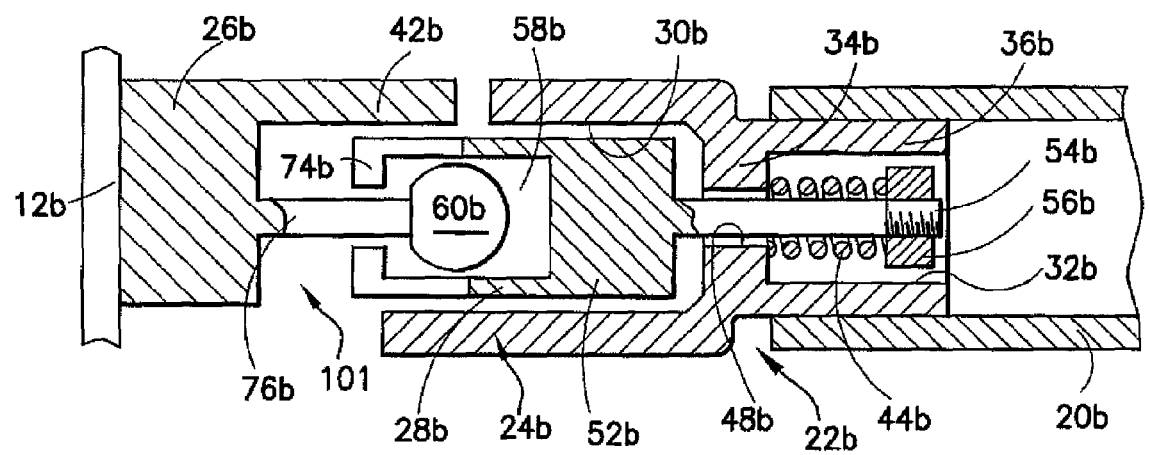
FIG. 7 is a sectional view similar to FIG. 3 of yet of another embodiment of the present invention.

In yet another embodiment shown in FIG. 7, the housing 26b is attached to the main frame 12b and the pin 76b is attached to the housing 26b. In FIG. 7, like elements from FIGS. 1-5 that have been adapted for the arrangement shown are given like numerals with the suffix "b" for clarity. It will be appreciated that the socket member 52b, housing 24b, projection 54b, and spring 44b are essentially identical to and operate in the same way as those elements shown in FIG. 3 such that when the temple 20b is rotated, the housing 24b will bear on and interact with overhang 42b in a manner similar to what has been described above. It also will be noted from FIG. 7 that pin 76b is of a suitable length to accommodate movement of the fingers of socket member 52b within gap 101. In operation, the ball 60b will remain in an essentially fixed position while the pin 76b slides within either slot of socket member 52b. When the temple 20b is folded, the spring 44b will compress and projection 54 will slide within opening 48 in a manner similar to that described above.

Figure 8:
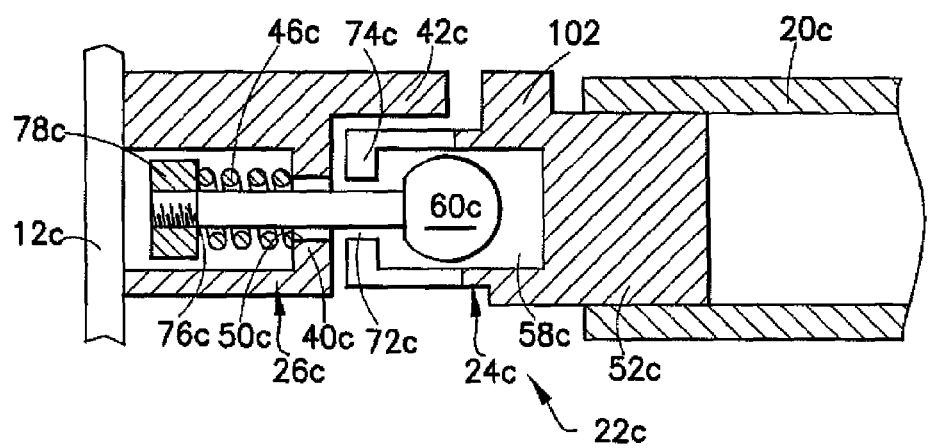
FIG. 8 is a sectional view similar to FIG. 3 of yet of another embodiment of the present invention.

In yet another embodiment shown in FIG. 8, socket member 52c is integrally formed with housing 24c and in turn attaches to the end of the temple 20c. In FIG. 8, like elements from FIGS. 1-5 that have been adapted for the arrangement shown are given like numerals with the suffix "c" for clarity. In this arrangement, flange 102 projects from the housing 24c to provide a member for the overhang 42c to bear on and interact with as the temple 20c is rotated. It will be noted from FIG. 8 that as the temple 20c is rotated, the spring 46c will compress and the pin 76c will slide within opening 50c as before to provide suitable clearance to allow the fingers of socket member 52c to move around the ball 60c. In operation, the socket member 52c will remain in an essentially fixed position relative to the temple 20c while the pin 76c slides within either slot of socket member 52c.

Figure 9:
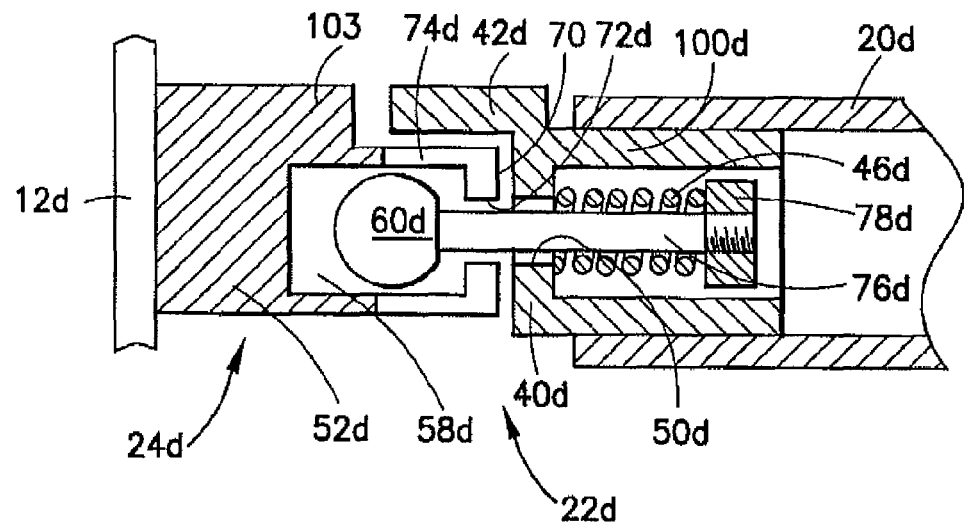
FIG. 9 is a sectional view similar to FIG. 3 of yet of another embodiment of the present invention.

In yet another embodiment shown in FIG. 9, the arrangement shown in FIG. 6 is adapted such that the housing 24d is integrally formed with the socket member 52d, which is attached to the main frame 12d. In FIG. 9, like elements from FIGS. 1-5 that have been adapted for the arrangement shown are given like numerals with the suffix "d" for clarity. In this arrangement, a stepped portion 103 is formed in the housing 24d to bear against and interact with overhang 42d. It will be noted from FIG. 9 that as the temple 20d is rotated, the spring 46d will compress in a manner similar to the arrangement shown in FIG. 6, however, the socket member 52d will remain essentially fixed. The pin 76d will slide within opening 50d as before to allow suitable clearance for the overhang 42d to move relative to the stepped portion 103. The fingers of socket member 52d will remain essentially stationary while the pin 76d slides in either slot of socket member 52d.

Figure 10:
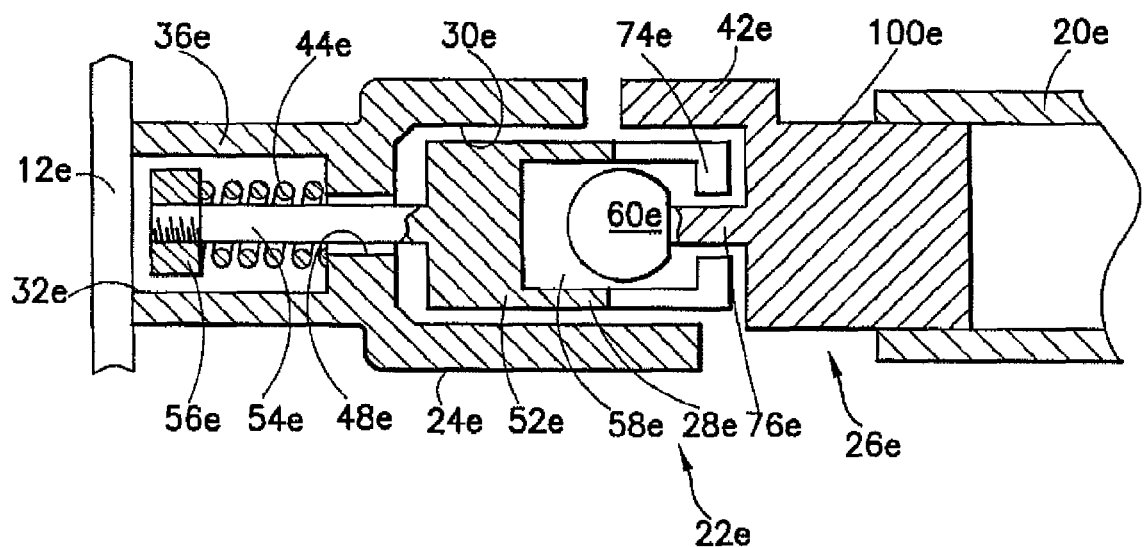
FIG. 10 is a sectional view similar to FIG. 3 of yet of another embodiment of the present invention.

In yet another embodiment shown in FIG. 10, the arrangement shown in FIG. 6 is adapted such that the housing 26e is integrally formed with the ball 60e and pin 76e. In FIG. 10, like elements from FIGS. 1-5 that have been adapted for the arrangement shown are given like numerals with the suffix "e" for clarity. In this arrangement, a stepped portion 42e bears against and interacts with the housing 24e, and the leg portion 100e is adapted to attach to the end of the temple 20e. It will be noted from FIG. 10 that as the temple 20e is rotated, the spring 44e will compress in a manner similar to the arrangement shown in FIG. 6, however, the ball 60e and pin 76e will remain essentially fixed. The projection 54e will slide within opening 48e as before to allow suitable clearance for the overhang 42e to move relative to the housing 24e. The socket member 52e is able to slide outward from the housing 24e while the stationary pin 76e slides in either slot of socket member 52e.

It will be appreciated, of course, that the pin and projection should be suitably sized to enable the necessary rotation of the overhangs with respect to the housings during rotation of the temple 20.

It will be further appreciated, of course, that various embodiments of the present invention permit the hinge assembly 22 to accommodate abnormal loads applied in a number of directions and the choice of using one or two springs (and the strength of such springs) will depend on the degree of movement that is desired. However, in each case, folding and unfolding of the temples 20 may be permitted while accommodating such abnormal loads.

It will also be seen that the provision of the ball and socket joint 28 according to various embodiments of the present invention permits the hinge assembly 22 to provide the desired range of movement for the temple as well as to accommodate the abnormal loads applied to thereto. At the same time, the provision of the socket member 52 and the flexible fingers 62, 64, 66, 68 facilitates the assembly of the components of various embodiments of the present invention by permitting an essentially straight axial insertion of the ball 60 into the cavity 58.

Referring now to FIGS. 11A-11C, it is seen that hinge assembly 22 may be attached to temple 20 via pin 1100 going through temple 20 into hinge assembly 22. Likewise, it is seen that hinge assembly 22 may be attached to temple region 18 of main frame 12 by pin 1102 going through temple region 18 of main frame 12 into hinge assembly 22. Of course, in other examples, the connection may be by glue, solder, crimping, bolts or any other desired mechanism.

Referring now to FIGS. 12A and 12B, another embodiment of the present invention is shown (FIG. 12A shows an exploded top view of a left side of a pair of eyeglasses incorporating a hinge assembly according to an embodiment of the present invention and FIG. 12B shows an exploded side view of the left side of the pair of eyeglasses incorporating the hinge assembly according to the embodiment of FIG. 12A). As seen in these figures, temple 1200 includes cavity 1202 (cavity 1202 may have a cylindrical cross section, a square cross-section, a rectangular cross section, a triangular cross section, or any other desired shape). Disposed within cavity 1202 is spring 1204 and pad 1206. Joint member 1208 is pivotally attached to temple 1200 via pivot pin 1210 (pivot pin 1210 goes through openings 1212, 1213 provided in temple 1200 as well as opening 1214 provided in joint member 1208). Joint member 1208 is also pivotally attached to temple region 1216 (of a main frame of the eyeglasses) via pivot pin 1218 (pivot pin 1218 goes through openings 1220,1221 provided in temple region 1216 as well as opening 1222 provided in joint member 1208). Finally, pad 1224 and spring 1226 are disposed within cavity 1228 of temple region 1216 (cavity 1228 may have a cylindrical cross section, a square cross-section, a rectangular cross section, a triangular cross section, or any other desired shape).

In operation, spring 1204 pushes out against pad 1206 to bias pad 1206 against joint member 1208. Depending upon the shape of the surface of joint member 1208 presented to pad 1206, this biasing action may: (a) serve to hold temple 1200 in one or more predefined positions as temple 1200 is pivoted up or down relative to temple region 1216; and/or (b) serve to move temple 1200 to one or more predefined positions as temple 1200 is pivoted up or down relative to temple region 1216.

Similarly, spring 1226 pushes out against pad 1224 to bias pad 1224 against joint member 1208. Depending upon the shape of the surface of joint member 1208 presented to pad 1224, this biasing action may: (a) serve to hold temple 1200 in one or more predefined positions as temple 1200 is pivoted laterally relative to temple region 1216; and/or (b) serve to move temple 1200 to one or more predefined positions as temple 1200 is pivoted laterally relative to temple region 1216 (of note, the orientation of the joint member 1208 may be moved such that each of pivot pins 1210,1218 is essentially orthogonal to the position shown in FIGS. 12A and 12B).

Referring now to FIGS. 13A and 13B, an arrangement similar to that shown in FIGS. 12A and 12B is shown. The principal difference here (as opposed to FIGS. 12A and 12B) is in the shape of temple 1300.

Referring now to FIGS. 14A and 14B, an arrangement similar to that shown in FIGS. 12A and 12B is shown. The principal difference here (as opposed to FIGS. 12A and 12B) is that temple region 1416 is formed as part of the main frame of the eyeglasses (as opposed to temple region 1216, which is attached (via screws or other mechanism) to the main frame of the eyeglasses).

Referring now to FIGS. 15A and 15B, an arrangement similar to that shown in FIGS. 12A and 12B is shown. The principal difference here (as opposed to FIGS. 12A and 12B) is that hinge box 1590 (with cavity 1592) is attached (via screws or other mechanism) to temple 1500 and hinge box 1594 (with cavity 1596 is attached (via screws or other mechanism) to temple region 1516 (of the main frame of the eyeglasses).

Figure 16A:
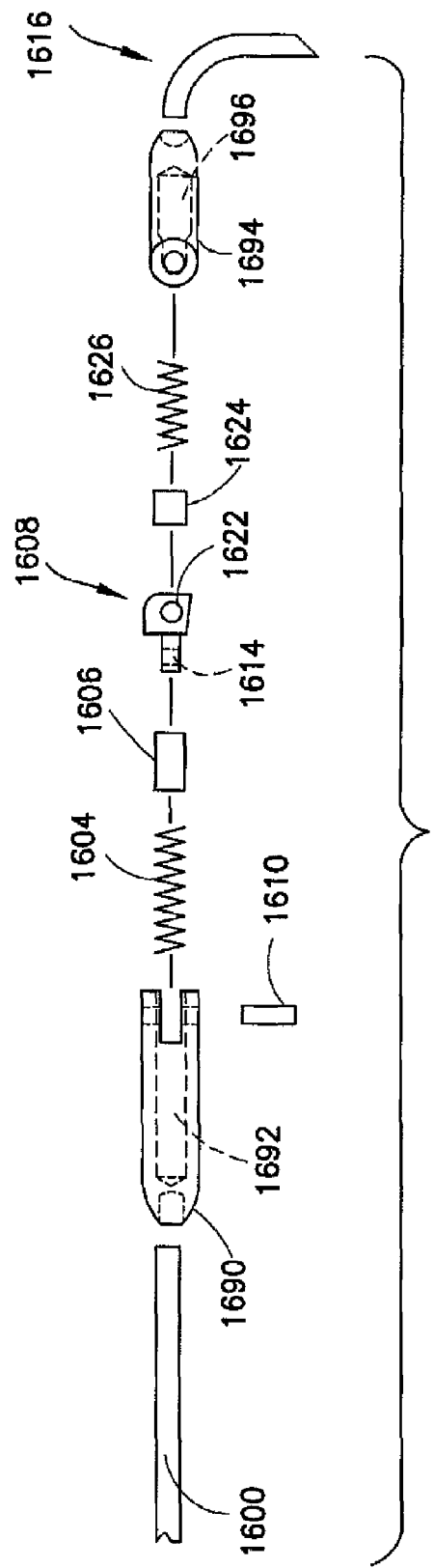
FIGS. 16A and 16B are exploded views showing the components of a hinge assembly according to another embodiment of the present invention.
Figure 16B:
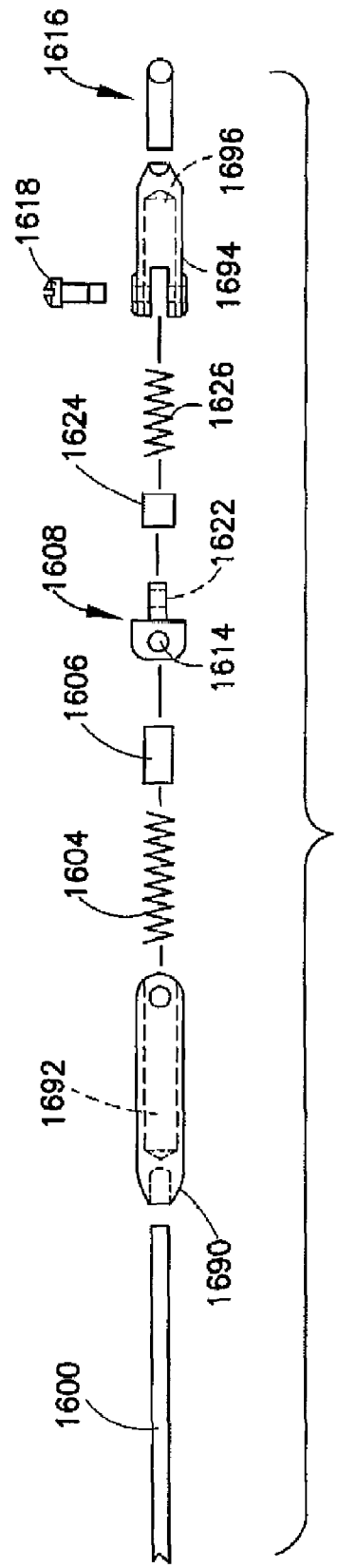
Figure 17A:
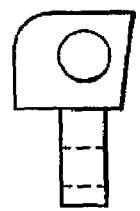
FIGS. 17A and 17B are views of a component of a hinge assembly according to another embodiment of the present invention.
Figure 18A:
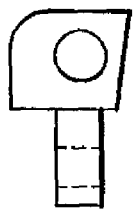
FIGS. 18A and 18B are views of a component of a hinge assembly according to another embodiment of the present invention.
Figure 19A:
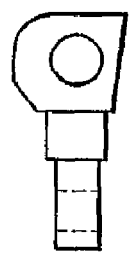
FIGS. 19A and 19B are views of a component of a hinge assembly according to another embodiment of the present invention.
Figure 20A:
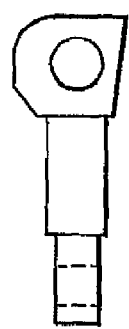
FIGS. 20A and 20B are views of a component of a hinge assembly according to another embodiment of the present invention.
Figure 21A:
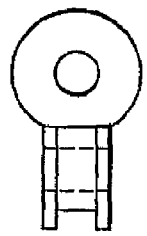
FIGS. 21A and 21B are views of a component of a hinge assembly according to another embodiment of the present invention.
Figure 17B:
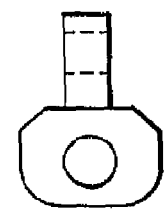
Figure 18B:
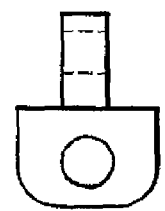
Figure 19B:
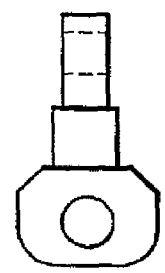
Figure 20B:
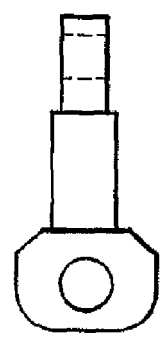
Figure 21B:
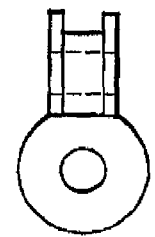
Figure 22A:
FIGS. 22A and 22B are views of a component of a hinge assembly according to another embodiment of the present invention.
Figure 23A:
FIGS. 23A and 23B are views of a component of a hinge assembly according to another embodiment of the present invention.
Figure 24A:
FIGS. 24A and 24B are views of a component of a hinge assembly according to another embodiment of the present invention.
Figure 22B:
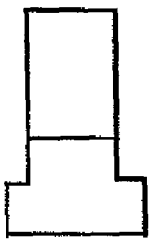
Figure 23B:
Figure 24B:
Figure 25A:
FIGS. 25A and 25B are views of a component of a hinge assembly according to another embodiment of the present invention.
Figure 25B:
Figure 26A:
FIGS. 26A and 26B are views of a component of a hinge assembly according to another embodiment of the present invention.
Figure 26B:

Referring now to FIGS. 16A and 16B, an arrangement similar to that shown in FIGS. 12A and 12B is shown. The principal difference here (as opposed to FIGS. 12A and 12B) is that hinge box 1690 (with cavity 1692) is attached (via an interference fit) to temple 1600 and hinge box 1694 (with cavity 1696) is attached (via an interference fit) to temple region 1616 (of the main frame of the eyeglasses).

Referring now to FIGS. 17-21, various additional examples of joint members of the type shown in FIGS. 12-16 are depicted. Of note, each of FIGS. 17A-21A shows a view along a first plane, and each of FIGS. 17B-21B shows a view along a second plane generally orthogonal to the first plane (that is, FIGS. 17A and 17B show two views of the same element; FIGS. 18A and 18B show two views of the same element; FIGS. 19A and 19B show two views of the same element; FIGS. 20A and 20B show two views of the same element; and FIGS. 21A and 21B show two views of the same element). Of further note, the different shapes of these elements may provide different positions at which the temple is held or moved and/or may require different amounts of force to hold or move the temple to such different positions.

Referring now to FIGS. 22-26, various additional examples of pads of the type shown in FIGS. 12-16 are depicted. Of note, each of FIGS. 22A-26A shows a view along a first plane, and each of FIGS. 22B-26B shows a view along a second plane different than the first plane (that is, FIGS. 22A and 22B show two views of the same element; FIGS. 23A and 23B show two views of the same element; FIGS. 24A and 24B show two views of the same element; FIGS. 25A and 25B show two views of the same element; and FIGS. 26A and 26B show two views of the same element). Of further note, the different shapes of these elements may provide different positions at which the temple is held or moved and/or may require different amounts of force to hold or move the temple to such different positions.

While a number of embodiments of the present invention have been described, it is understood that these embodiments are illustrative only, and not restrictive, and that many modifications may become apparent to those of ordinary skill in the art. For example, the fingers/slots of the socket may define any desired number of predetermined paths to permit rotational and/or pivotal movement between the ball and socket. Further, while various housings have been shown as disposed within the temple, such housings could, in other examples, be disposed adjacent the temple or surrounding the temple. Likewise, while various housings have been shown as attached to the temple region of the main frame, such housings could, in other examples, be disposed within the temple region or surrounding the temple region. Further still, any steps described herein may be carried out in any desired order (and any additional steps may be added as desired and any steps may be deleted as desired).

What is claimed is:

1. A hinge assembly, comprising:
a socket member attached to an end of a temple of a pair of eyeglasses; and
a ball member attached to a temple region of a main frame of the pair of eyeglasses;
wherein the ball member is configured to be received and held within the socket member; and
wherein each of: (a) the socket member is resiliently attached to the end of the temple; and (b) the ball member is resiliently attached to the temple region of the main frame.

2. The hinge assembly of claim 1, further comprising a housing having a first cavity into which at least a portion of the socket member is received, wherein the housing is attached to the end of the temple.

3. The hinge assembly of claim 2, further comprising a socket member projection, wherein the socket member projection extends, when the socket member is at least partially within the first cavity, into a second cavity in the housing.

4. The hinge assembly of claim 3, further comprising a spring disposed at least partially within the second cavity, wherein a partition separates the first cavity from the second cavity, wherein the socket member projection extends from the first cavity to the second cavity through an opening in the partition, and wherein the spring biases the socket member towards the partition.

5. The hinge assembly of claim 1, further comprising a housing having a cavity into which at least a portion of a pin of the ball member is received, wherein the housing is attached to the temple region of the main frame.

6. The hinge assembly of claim 5, further comprising a spring disposed at least partially within the cavity, wherein a partition at least partially defines the cavity, wherein the ball member pin extends into the cavity through an opening in the partition, and wherein the spring biases the ball member towards the partition.

7. The hinge assembly of claim 1, wherein the socket member includes at an end thereof a plurality of flexible fingers, and wherein the fingers are configured to flex open to allow the ball member to enter the socket member.

8. The hinge assembly of claim 7, wherein each of the fingers includes at a free end thereof a flange, and wherein each flange helps to retain the ball member within the socket member when the fingers flex closed.

9. The hinge assembly of claim 1, wherein the socket member includes at least one slot for guiding movement of a ball member pin extending from the ball member.

10. The hinge assembly of claim 9, wherein the socket member includes two essentially orthogonal slots for guiding movement of the ball member pin extending from the ball member.

11. A hinge assembly, comprising:
a socket member attached to a temple region of a main frame of a pair of eyeglasses; and
a ball member attached to an end of a temple of the pair of eyeglasses;
wherein the ball member is configured to be received and held within the socket member; and
wherein each of: (a) the socket member is resiliently attached to the temple region of the main frame; and (b) the ball member is resiliently attached to the end of the temple.

12. The hinge assembly of claim 11, further comprising a housing having a first cavity into which at least a portion of the socket member is received, wherein the housing is attached to the temple region of the main frame.

13. The hinge assembly of claim 12, further comprising a socket member projection, wherein the socket member projection extends, when the socket member is at least partially within the first cavity, into a second cavity in the housing.

14. The hinge assembly of claim 13, further comprising a spring disposed at least partially within the second cavity, wherein a partition separates the first cavity from the second cavity, wherein the socket member projection extends from the first cavity to the second cavity through an opening in the partition, and wherein the spring biases the socket member towards the partition.

15. The hinge assembly of claim 11, further comprising a housing having a cavity into which at least a portion of a pin of the ball member is received, wherein the housing is attached to the end of the temple.

16. The hinge assembly of claim 15, further comprising a spring disposed at least partially within the cavity, wherein a partition at least partially defines the cavity, wherein the ball member pin extends into the cavity through an opening in the partition, and wherein the spring biases the ball member towards the partition.

17. The hinge assembly of claim 11, wherein the socket member includes at an end thereof a plurality of flexible fingers, and wherein the fingers are configured to flex open to allow the ball member to enter the socket member.

18. The hinge assembly of claim 17, wherein each of the fingers includes at a free end thereof a flange, and wherein each flange helps to retain the ball member within the socket member when the fingers flex closed.

19. The hinge assembly of claim 11, wherein the socket member includes at least one slot for guiding movement of a ball member pin extending from the ball member.

20. The hinge assembly of claim 19, wherein the socket member includes two essentially orthogonal slots for guiding movement of the ball member pin extending from the ball member.

21. A pair of hinge assemblies, comprising:
(a) a first hinge assembly, comprising:
a socket member attached to an end of a right temple of a pair of eyeglasses; and
a ball member attached to a right temple region of a main frame of the pair of eyeglasses;
wherein the ball member is configured to be received and held within the socket member; and
wherein each of: (a) the socket member is resiliently attached to the end of the right temple; and (b) the ball member is resiliently attached to the right temple region of the main frame; and
(b) a second hinge assembly, comprising:
a socket member attached to an end of a left temple of the pair of eyeglasses; and a ball member attached to a left temple region of the main frame of the pair of eyeglasses;

wherein the ball member is configured to be received and held within the socket member; and wherein each of: (a) the socket member is resiliently attached to the end of the left temple; and (b) the ball member is resiliently attached to the left temple region of the main frame.

22. A pair of hinge assemblies, comprising:

(a) a first hinge assembly, comprising:

a socket member attached to a right temple region of a main frame of a pair of eyeglasses; and a ball member attached to an end of a right temple of the pair of eyeglasses;

wherein the ball member is configured to be received and held within the socket member; and wherein each of: (a) the socket member is resiliently attached to the right temple region of the main frame; and (b) the ball member is resiliently attached to the right temple; and (b) a second hinge assembly, comprising:

a socket member attached to a left temple region of the main frame of the pair of eyeglasses; and a ball member attached to an end of a left temple of the pair of eyeglasses;

wherein the ball member is configured to be received and held within the socket member; and wherein each of: (a) the socket member is resiliently attached to the left temple region of the main frame; and (b) the ball member is resiliently attached to the left temple.

* * * * *